United States Patent
Verwaerde et al.

(10) Patent No.: US 7,329,032 B2
(45) Date of Patent: Feb. 12, 2008

(54) HOUSING STRUCTURE FOR LIGHT UNIT, CHASSIS PART FOR HOUSING A LIGHT UNIT AND EXTERNAL MODULE COMPRISING A CHASSIS PART AND LIGHT UNIT

(75) Inventors: Marc Verwaerde, Moras (FR); Gerald Andre, Amberieu en Bugey (FR); Alexis Michaut, Caluire (FR)

(73) Assignee: Compagnie Plastic Omnium, Lyons (FR)

( * ) Notice: Subject to any disclaimer, the term of this patent is extended or adjusted under 35 U.S.C. 154(b) by 91 days.

(21) Appl. No.: 10/536,529

(22) PCT Filed: Jun. 7, 2004

(86) PCT No.: PCT/FR2004/001413

§ 371 (c)(1),
(2), (4) Date: Jan. 9, 2006

(87) PCT Pub. No.: WO2004/110810

PCT Pub. Date: Dec. 23, 2004

(65) Prior Publication Data

US 2006/0152042 A1    Jul. 13, 2006

(30) Foreign Application Priority Data

Jun. 6, 2003    (FR) .................... 03 06906

(51) Int. Cl.
*F21W 101/10*    (2006.01)

(52) U.S. Cl. ............... 362/507; 362/506; 362/549; 296/198

(58) Field of Classification Search ................ 362/506, 362/507, 549; 296/198, 187.04
See application file for complete search history.

(56) References Cited

U.S. PATENT DOCUMENTS

| | | | | | |
|---|---|---|---|---|---|
| 1,828,233 | A | * | 10/1931 | Smith | 362/516 |
| 2,113,919 | A | * | 4/1938 | Korematsu | 362/540 |
| 2,557,872 | A | * | 6/1951 | Holland | 362/506 |
| 3,454,757 | A | * | 7/1969 | Bell | 362/540 |
| 3,941,994 | A | * | 3/1976 | Petty et al. | 362/506 |
| 4,894,755 | A | * | 1/1990 | Chandler | 362/506 |
| 4,953,065 | A | * | 8/1990 | Kao | 362/485 |
| 5,893,638 | A | * | 4/1999 | Hufner et al. | 362/506 |
| 6,332,700 | B1 | * | 12/2001 | Baines | 362/486 |
| 6,416,209 | B1 | * | 7/2002 | Abbott | 362/506 |
| 6,910,788 | B2 | * | 6/2005 | Jones | 362/506 |

(Continued)

FOREIGN PATENT DOCUMENTS

DE    19946995    4/2000

*Primary Examiner*—Laura Tso
(74) *Attorney, Agent, or Firm*—James R. Williams

(57) ABSTRACT

The invention provides a receiver structure for receiving a light unit having a glass for fitting to a motor vehicle fender, the fender and the glass including means for putting the glass of the light unit into a reference position relative to the fender, the receiver structure comprising: fastener means for fastening the receiver structure to the fender; and fastener means for fastening the light unit to the receiver structure, which means conserve the reference position of the glass relative to the fender as imposed by the means for putting the glass into a reference position. The invention also provides an outside module for a motor vehicle, a fender, and a method of mounting a light unit on a fender.

23 Claims, 3 Drawing Sheets

U.S. PATENT DOCUMENTS

2001/0022729 A1 9/2001 Maeda
2002/0117875 A1 8/2002 Hoffner
2003/0002292 A1* 1/2003 Schmidt et al. ............. 362/487
2005/0088015 A1 4/2005 Kishikawa

* cited by examiner

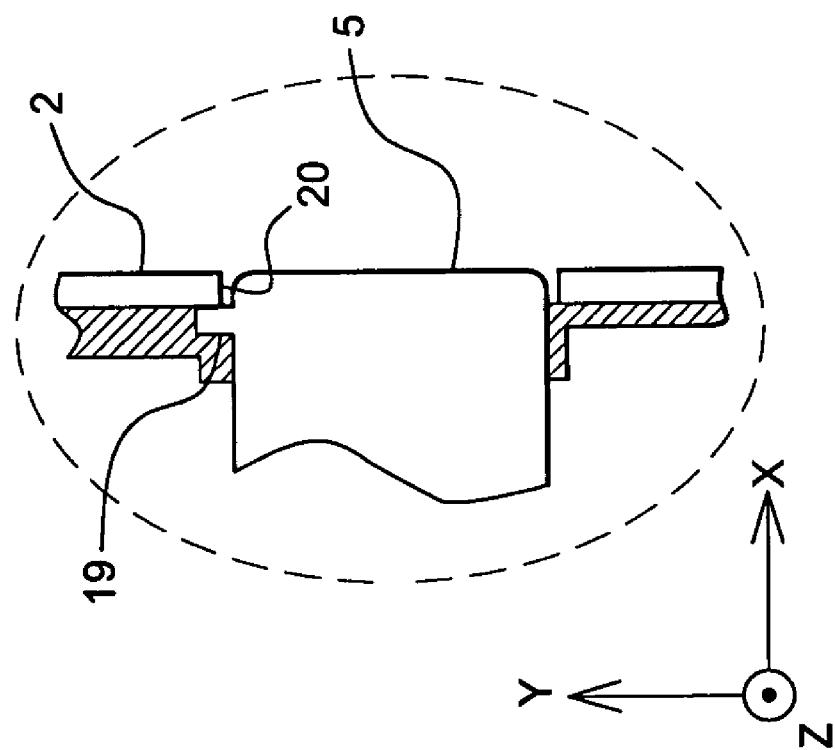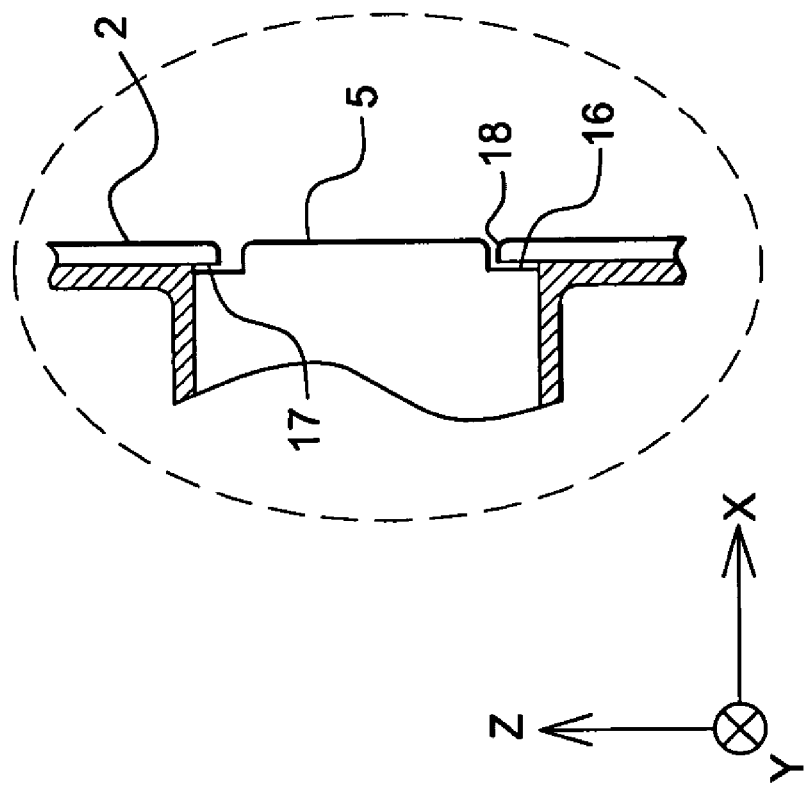

HOUSING STRUCTURE FOR LIGHT UNIT, CHASSIS PART FOR HOUSING A LIGHT UNIT AND EXTERNAL MODULE COMPRISING A CHASSIS PART AND LIGHT UNIT

The present invention relates to a structure for receiving a light unit, to a bodywork part capable of receiving a light unit, and to an outside module comprising a bodywork part and a light unit.

BACKGROUND OF THE INVENTION

Present techniques for assembling motor vehicles are tending towards making modules of varying degrees of complexity that are prepared off the assembly line, and that are subsequently fitted to the vehicle body together with all of the members with which they are fitted, thereby considerably shortening assembly lines and the time required to manufacture vehicles.

Thus, light units are conventionally mounted on receiver structures of the front end module type, being positioned and oriented on such receiver structures in compliance with dimensions that are defined relative to an ideal vehicle body. The ideal vehicle is represented by a gauge which serves as the frame of reference while the light units are being secured to the receiver structures.

In practice, vehicle bodies present relatively large dimensional variations, so modules fitted to such bodies can position light units in non-satisfactory manner. It can then be found necessary to perform subsequent adjustment in order to reposition the light units.

More precisely, the difficulty results from the fact that the tolerance ranges on a plurality of parts are cumulative at the time of mounting light units.

Apart from the tolerance ranges specific to a light unit and to the body, use of a gauge adds tolerance ranges associated firstly with the positioning of the light units on the module relative to the gauge, and secondly to the positioning of the module on the body.

SUMMARY OF THE INVENTION

An object of the present invention is to reduce this accumulation of tolerance ranges in an outside module of a motor vehicle.

The invention presents other advantages which appear on reading the following description.

The present invention provides a receiver structure for receiving a light unit having a glass for fitting to a motor vehicle fender, the fender and the glass including means for putting the glass of the light unit into a reference position relative to the fender, the receiver structure comprising:
  fastener means for fastening the receiver structure to the fender; and
  fastener means for fastening the light unit to the receiver structure, which means conserve the reference position of the glass relative to the fender as imposed by the means for putting the glass into a reference position.

According to other characteristics that are optional:
  the receiver structure is made of plastics material;
  it is arranged to reinforce the fender locally;
  the fastener means for fastening the light unit to the receiver structure are the only means for fastening the light unit to the vehicle;
  the dimensions of the receiver structure are such that it is received between top and bottom rims of the fender;
  it is shaped to prevent the fender blistering in the vicinity of the light unit;
  it includes support means for supporting the light unit fastened to the fender, said support means being designed for mounting to the structure of the vehicle;
  the support means are secured to the receiver structure;
  the support means have at least one degree of freedom relative to the fender;
  the support means are a slideway;
  the fastener means for fastening the receiver structure to the fender consist in adhesiving, gluing welding, clipping, riveting, heading, or bolting the receiver structure to the fender;
  the fastener means for fastening the receiver structure to the fender and/or the fastener means for fastening the light unit to the receiver structure are fusible;
  it includes means for fastening a wheel arch;
  it is arranged to absorb the energy of impacts against the legs or hips of pedestrians;
  it includes a connection interface between the fender and a structural part of the vehicle;
  the connection interface consists in sliding fastenings;
  the connection interface consists in an energy absorber for absorbing impacts against the heads of pedestrians; and
  it includes fastener means for fastening functional members of the vehicle such as a windshield washer jar, a tank, a headlight washer, lights, or an electronic device.

The invention also provides an outside module for a motor vehicle comprising a fender and an light unit including a glass, the module including a receiver structure as described above.

The invention also provides a motor vehicle fender including a receiver structure as described above.

Finally, the invention provides a method of mounting a light unit on a bodywork fender having a receiver structure as defined above, the method consisting:
  in putting the glass of the light unit into a reference position relative to the fender; and
  in fastening the light unit to the receiver structure by means present respectively on the light unit and on the receiver structure for definitively conserving the position obtained when the unit is put into its reference position.

BRIEF DESCRIPTION OF THE DRAWINGS

The invention will be better understood on reading the following description given purely by way of example and made with reference to the accompanying drawings, in which:

FIG. 3 is an enlarged view of region III of FIG. 2; and

FIG. 4 is a section on IV-IV of FIG. 2.

DETAILED DESCRIPTION OF THE INVENTION

Figure 1:
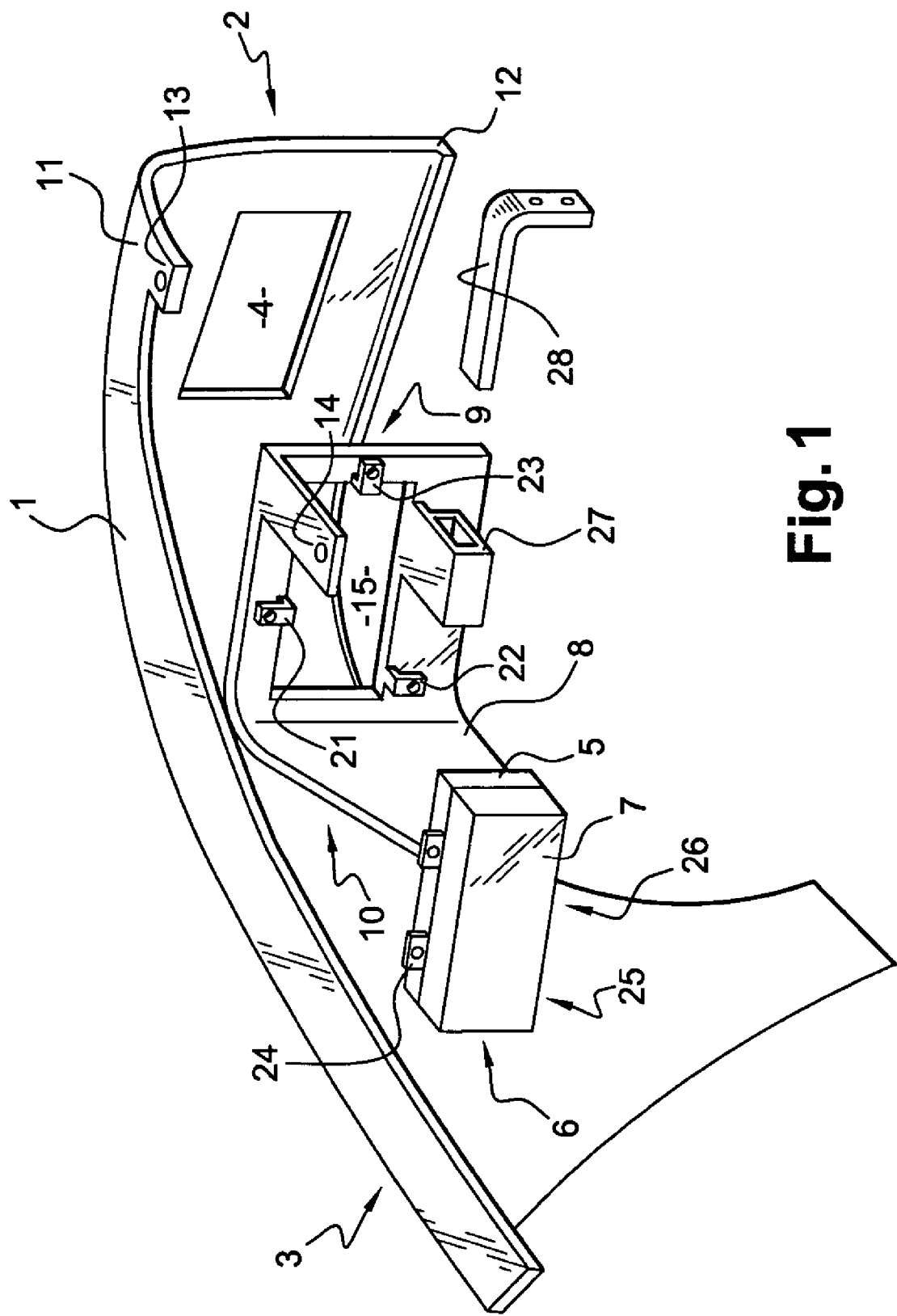
FIG. 1 is an exploded perspective view seen from the inside of a left front fender of an outside module constituting a particular embodiment of the invention.
Figure 2:
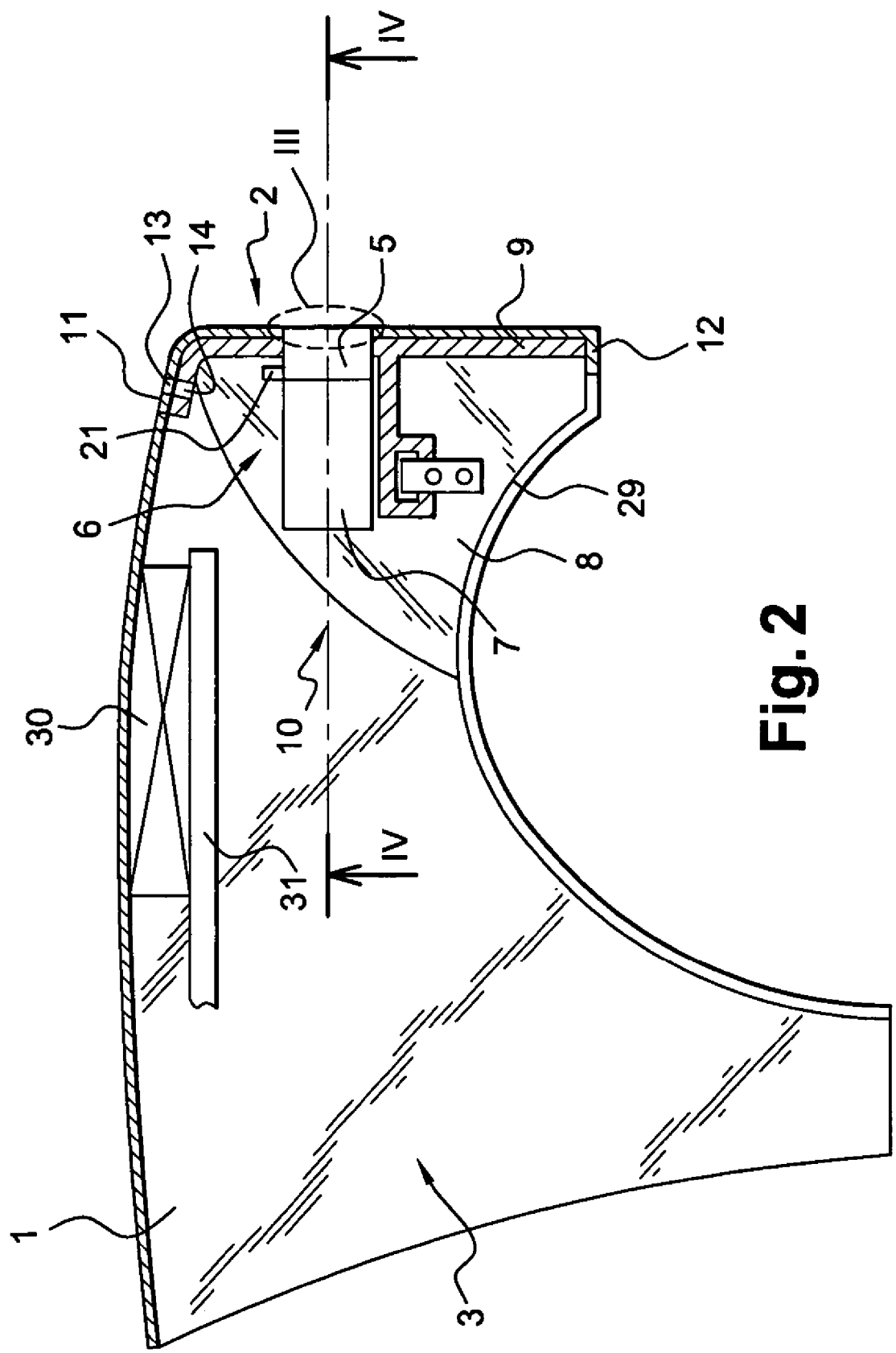
FIG. 2 is an elevation view on II of FIG. 1.

In the figures, the various parts are shown diagrammatically, and their shapes can be varied depending on the desired application.

The figures show a fender 1 of plastics material comprising a front portion 2 and a side portion 3. The front portion defines an opening 4 for a glass 5 of a light unit 6 comprising a housing 7 united with the glass 5.

A receiver structure 8 is designed to be interposed between the front portion 2 of the fender 1 and the light unit 6. This structure is made of polypropylene filled with 30% to 40% talc, and comprises a front portion 9 shaped to be pressed against the front portion 2 of the fender, and a side portion 10 shaped to follow the side portion 3 of the fender. The dimensions of the structure 8 are such that it is received between top and bottom rims 11 and 12 of the fender. Lines of welding (not shown) constitute means for fastening the receiver structure 8 to the fender 1. In addition, fixing tabs 13 and 14 are provided respectively on the top edge 11 of the fender and on the receiver structure 9 to provide additional fastener means.

In its front portion 9, the receiver structure 8 has a window 15 that coincides with the opening 4 in the fender when said structure is secured thereto. The glass 5 of the light unit 6 can thus pass through the window 15 to take its place in the opening 4 and come flush with the front face of the fender.

The periphery of the opening 4, seen more clearly in FIGS. 3 and 4, has bearing surfaces constituting support points, also referred to as isostatic points for putting the glass of the light unit into a reference position relative to the fender.

Two first bearing surface 16 and 17 are situated on respective margins of the opening 4 to provide positioning in the longitudinal direction (X) of the vehicle. A bearing surface 18 situated on the top of the bottom horizontal margin of the opening 4 provides positioning in the vertical direction (Z).

In addition, the glass 5 of the light unit includes a peg 19 on one of its side edges, which peg 19 penetrates into a half-oblong recess formed in the rim of the fender. The peg provides third positioning relative to the X direction and second positioning relative to the Z direction.

Finally, a bearing surface 20 provides positioning relative to the transverse direction (Y) of the vehicle, on one of the side margins of the opening 4.

By means of these six fixed bearing points, the glass 5 is put appropriately into a reference position relative to the fender when it is pressed against the front face 2 of the fender.

During assembly, the light unit 6 is held temporarily in this position with the glass in its reference position relative to the fender, and the light unit is secured to the receiver structure by passing bolts through the fixing tabs 21, 22, 23, 24, 25, and 26 formed respectively on the light unit 6 and on the receiver structure 8. These tabs present the ability to deform so as to conserve a final position for the light unit on the receiver structure as obtained when the glass is put into its reference position relative to the fender.

Furthermore, given the weight of the light unit 6, the receiver structure is provided with support means in the form of a slideway 27 made integrally with its front portion 9 and located immediately below the location of the light unit, and a bracket 28 for mounting on a structural part of the vehicle. These support means include a degree of freedom relative to the fender: sliding can take place freely along the transverse direction Y. Thus, the fender can be subject to thermal expansion, e.g. as a result of it being exposed to sunlight, without support for the light unit being degraded.

The slideway 27 advantageously constitutes a fuse member, or has a declutchable bottom fastening, thus enabling the light unit to be preserved in the event of a high energy impact (Danner impact).

The receiver structure may also present other functions, in particular:

means for fastening a wheel arch along the bottom edge 29 of the side portion 10 of the receiver structure, which bottom edge 9 matches the shape of the fender;

the presence of at least a portion of a connection interface 30 connecting the top edge of the fender to a top side rail 31 of the vehicle;

a configuration enabling energy to be absorbed in the event of an impact between the front portion 2 of the fender with the legs or hips of a pedestrian;

a configuration providing support in the event of someone sitting on the fender;

the fastener means between the fender and the receiver structure acts as a fuse, where such fusibility can be provided by the tabs 13 and 14 or by the elements for connecting them together;

the fastener means between the light unit 6 and the receiver structure can act as a fuse, with fusibility being provided with tabs 21-26 or by the elements connecting them together; and support for functional members such as tanks, and/or electronic and/or lighting and/or cleaning devices.

Each of these functions is that much easier to add to the receiver structure when the receiver structure is itself made of plastics material.

Amongst the advantages provided by the receiver structure, mention can be made of the fact that it provides local reinforcement to the fender, and because it expands little, it limits displacements of the fender about the light unit in the event of being exposed to sunlight, while away from the vicinity of the light unit, the fender can expand in much more uniform manner. When the receiver structure is made of a flexible plastics material, it is capable of withstanding a Danner impact, which demonstrates the advantage that can be presented by integrating functions into said receiver structure.

What is claimed is:

1. A receiver structure for receiving a light unit having a glass for fitting to a motor vehicle fender, the fender and the glass including means for putting the glass of the light unit into a reference position relative to the fender, the receiver structure comprising:

fastener means for fastening the receiver structure to the fender; and fastener means for fastening the light unit to the receiver structure, which means conserve the reference position of the glass relative to the fender as imposed by the means for putting the glass into a reference position.

2. A receiver structure according to claim 1, consisting essentially of plastics material.

3. A receiver structure according to claim 1, arranged to reinforce the fender locally.

4. A receiver structure according to claim 1, in which the fastener means for fastening the light unit to the receiver structure are the only means for fastening the light unit to the vehicle.

5. A receiver structure according to claim 1, of dimensions such that the receiver structure is received between top and bottom rims of the fender.

6. A receiver structure according to claim 1, shaped to prevent the fender blistering near the light unit.

7. A receiver structure according to claim 1, including support means for supporting the light unit fastened to the fender, said support means being designed for mounting to a structure of the vehicle.

8. A receiver structure according to claim 7, in which the support means are secured to the receiver structure.

9. A receiver structure according to claim 7, in which the support means have at least one degree of freedom relative to the fender.

10. A receiver structure according to claim 9, in which the support means are a slideway.

11. A receiver structure according to claim 1, in which the fastener means for fastening the receiver structure to the fender consist of fastening the receiver structure to the fender using a fastener selected from a group consisting of adhesive, glue, welds, clips, rivets, heads and bolts.

12. A receiver structure according to claim 1, in which the fastener means for fastening the receiver structure to the fender are fusible.

13. A receiver structure according to claim 1, including means for fastening a wheel arch along a bottom edge of a side portion of the receiver structure.

14. A receiver structure according to claim 1, arranged to absorb the energy of impacts against pedestrians.

15. A receiver structure to claim 1, including a connection interface between the fender and a structural part of the vehicle.

16. A receiver structure according to claim 15, in which the connection interface consists in sliding fastenings.

17. A receiver structure according to claim 15, in which the connection interface consists in an energy absorber for absorbing impacts against the heads of pedestrians.

18. A receiver structure according to claim 1, including fastener means for fastening functional members of the vehicle such functional members selected from a group consisting of a windshield washer jar, a tank, a headlight washer, lighting, and an electronic device.

19. An outside module for a motor vehicle, the module comprising a fender and a light unit including a glass, the module including a receiver structure for receiving a light unit having a glass for fitting to a motor vehicle fender, the fender and the glass including means for putting the glass of the light unit into a reference position relative to the fender, the receiver structure comprising:

fastener means for fastening the receiver structure to the fender; and fastener means for fastening the light unit to the receiver structure, which means conserve the reference position of the glass relative to the fender as imposed by the means for putting the glass into a reference position.

20. An outside module according to claim 19, in which the fender consists essentially of plastics material.

21. A motor vehicle fender, including a receiver structure for receiving a light unit having a glass for fitting to a motor vehicle fender, the fender and the glass including means for putting the glass of the light unit into a reference position relative to the fender, the receiver structure comprising:

fastener means for fastening the receiver structure to the fender; and fastener means for fastening the light unit to the receiver structure, which means conserve the reference position of the glass relative to the fender as imposed by the means for putting the glass into a reference position.

22. A method of mounting a light unit on a bodywork fender provided with a receiver structure for receiving a light unit having a glass for fitting to a motor vehicle fender, the fender and the glass including means for putting the glass of the light unit into a reference position relative to the fender, the receiver structure comprising:

fastener means for fastening the receiver structure to the fender; and fastener means for fastening the light unit to the receiver structure, which means conserve the reference position of the glass relative to the fender as imposed by the means for putting the glass into a reference position, the method consisting of:

putting the glass of the light unit into a reference position relative to the fender; and fastening the light unit to the receiver structure by means present respectively on the light unit and on the receiver structure for definitively conserving the position obtained when the unit is put into its reference position.

23. A receiver structure according to claim 1, wherein the fastener means for fastening the light unit to the receiver structure are fusible.

* * * * *